Figure 1:
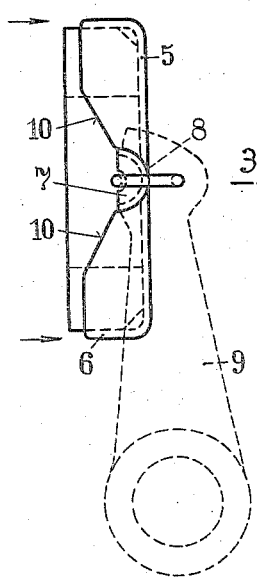

Jan. 31, 1939.　　　　R. BINDER　　　　2,145,538

THROW-OUT BEARING FOR SHAFT COUPLINGS

Filed March 31, 1938

Inventor
Richard Binder
per
[signature]

Patented Jan. 31, 1939

2,145,538

UNITED STATES PATENT OFFICE 2,145,538

THROW-OUT BEARING FOR SHAFT COUPLINGS

Richard Binder, Schweinfurt, Germany

Application March 31, 1938, Serial No. 199,163
In Germany April 6, 1937

5 Claims. (Cl. 192—110)

The present invention relates to throw-out bearings for shaft couplings.

In known throw-out devices for couplings the member directly transmitting the throw-out pressure upon the coupling members, for instance levers, in most cases includes a rolling bearing or a graphite slip ring. This member is arranged and held in a special bearing. Generally this bearing or holder forms a frame of angular cross section the circumference of which is provided at two diametrically opposite points with pivots, allowing an automatic adjustment of said bearing or holder. The frame acts in the manner of a clamping ring and is provided with a tightening screw in order to allow an easy exchange of the transmitting member. Such bearings or holders have been made only from castings or parts of malleable iron which have been machined by means of cutting tools.

The present invention relates to a particular construction of such a bearing or holder in an economical and simple form, in which the transmitting member, being held by the elasticity of the bearing or holder, may, however, easily be exchanged after the bearing or holder has been bent off. Of this bearing or holder, punched of sheet metal, some details are of importance which allow bending of the bearing or holder and the purpose of which is to obtain an exact guidance at the shifting device.

In the accompanying drawing one construction according to the invention is shown by way of example.

Figure 2:
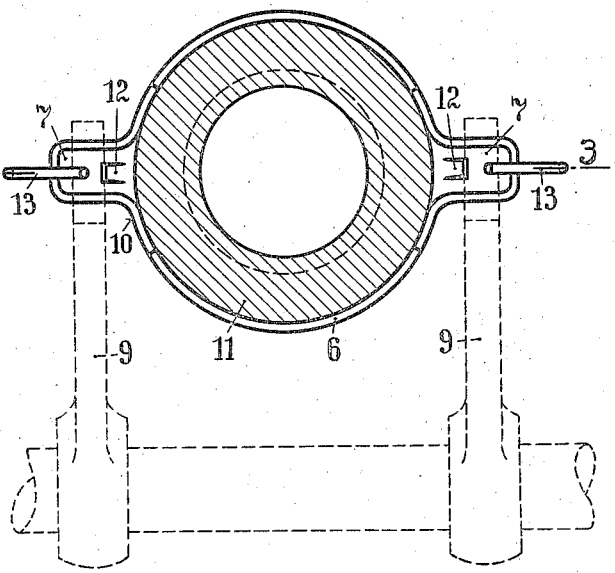
Figure 3:
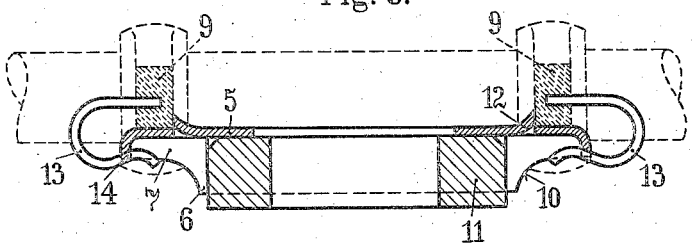

In the drawing:

Fig. 1 is a side elevation of the bearing or holder showing its connection to the transmitting member and to the shifting device, Fig. 2 is a front elevation of the device shown in Fig. 1, and Fig. 3 is a cross section through the bearing or holder on line 3—3 of Fig. 2.

The bearing or holder in the form of a cup-shaped collar has the shape of a disc 5 recessed in the center and provided with a bent rim 6, so that a cross section of angular form results. At diametrically opposite points of the bearing or holder radial enlargements 7 are formed by punching the height of which is smaller than that of the rim 6 and the bottom of which is semi-cylindrically rounded out to form hollow pivots allowing adjustment of the bearing or holder in a socket 8 of the shifting levers 9. The bridging portion 10 from the edge of the rim 6 to the edge of the enlargement 7 extends obliquely as may be seen from Figs. 1 and 3, so that the bearing or holder, due to the recesses formed, may be bent along the line 3—3. Owing to this resiliency of the bearing or holder, the transmitting member 11 which normally is clamped in the rim 6 may be released by bending rearwardly the upper and lower half of the bearing or holder in the direction of the arrows shown in Fig. 1. The transmitting member 11 then may easily be pushed out of the bearing or holder 5, 6. To obtain the required elasticity of the bearing or holder, the latter preferably is punched and drawn from sheet steel.

To maintain the bearing or holder in the correct position between the two shifting levers 9, so that the fillets, provided between the circumference of the bearing or holder and the pivots 7, are prevented from binding in the sockets 8, breaches 12 are punched and bent outwardly in the bottom of the two pivots 7, so that the free ends of these breaches bear against the oppositely arranged side faces of the shifting levers 9. The bearing or holder, therefore, may swing about its pivots without a shifting occurring in the direction of the axis 3—3.

With the coupling mounted, it must be possible to easily remove the bearing or holder out of its operative position to allow an exchange of the transmitting member 11. To this end the bearing or holder is held in the sockets 8 by easily removable, yoke-like resilient pressing means 13. The straight shanks of these pressing means, formed as wire yokes 13, are inserted in recesses provided at the outer side of the levers 9, as shown in Fig. 3, whereas the S-shaped shanks engage the ends of the pivots being held in a notch 14 provided in the edge of the pivots. The yokes 13 may easily be withdrawn, whereupon the bearing or holder may be lifted from the levers.

Having now particularly described and ascertained the nature of my invention and in what manner the same is to be performed, I declare that what I claim is:

1. A throw-out bearing for shaft couplings, comprising a collar, pivots provided on said collar at diametrically opposite points, a rim on said collar and having recesses at the points of said pivots, allowing a resiliently flexing removal of said collar, a member transmitting throw-out pressure, exchangeably held in said collar, said collar consisting of an angular frame formed of a single piece of sheet metal, resiliently surrounding said member transmitting throw-out pressure.

2. A throw-out bearing for shaft couplings, comprising shifting levers, a collar mounted in said levers, pivots carried by said collar at diametrically opposite points and provided with breaches the projecting end faces of which effect lateral guidances of the collar at said shifting levers, a rim formed on said collar and having recesses at the points of said pivots, allowing a resiliently flexing removal of said collar, a member transmitting throw-out pressure, exchangeably held in said collar, said collar consisting of an angular frame formed of a single piece of sheet metal, resiliently surrounding said member transmitting throw-out pressure.

3. A throw-out bearing for shaft couplings, comprising shifting levers, sockets carried by said shifting levers, a collar swingably mounted in said levers, pivots carried by said collar at diametrically opposite points and provided with breaches the projecting end faces of which effect lateral guidance of the collar at said shifting levers, a rim formed on said collar and having recesses at the points of said pivots, allowing a resiliently flexing removal of said collar, a member transmitting throw-out pressure, exchangeably held in said collar, yoke-shaped springs holding said collar in said sockets of said shifting levers, a straight shank of each of said springs being inserted in a recess provided in said shifting levers and an S-shaped shank of each of said springs surrounding said pivots carried by said collar, said collar consisting of an angular frame formed of a single piece of sheet metal, resiliently surrounding said member transmitting throw-out pressure.

4. A throw-out bearing for shaft couplings comprising a cup-shaped collar formed of a single piece of sheet metal, and having a rim provided with pivots arranged at diametrically opposite points, and a member transmitting throw-out pressure, removably held in said collar, said rim having sufficient inherent resiliency to be self-flexed into resilient engagement with the periphery of said member.

5. A throw-out bearing for shaft couplings comprising a cup-shaped collar, having a rim provided with radially outwardly extending extensions at diametrically opposite points, presenting semicylindrical surfaces on their outer sides, said collar and extensions being formed of a single piece of sheet metal, and a member transmitting throw-out pressure removably held in said collar, said rim having sufficient inherent resiliency to be self-flexed into resilient engagement with the periphery of said member.

RICHARD BINDER.